(12) United States Patent
Quinn et al.

(10) Patent No.: US 6,818,269 B2
(45) Date of Patent: Nov. 16, 2004

(54) METALLIC BOARD

(75) Inventors: John W. Quinn, Crystal Lake, IL (US); Jack A. Fuechsl, Winfield, IL (US)

(73) Assignee: DOT Packaging Group, Inc., Fort Wayne, IN (US)

( * ) Notice: Subject to any disclaimer, the term of this patent is extended or adjusted under 35 U.S.C. 154(b) by 0 days.

(21) Appl. No.: 10/259,063

(22) Filed: Sep. 27, 2002

(65) Prior Publication Data

US 2004/0062887 A1 Apr. 1, 2004

(51) Int. Cl.[7] .................. B29D 22/00; B29D 23/00; B32B 1/08; B65D 83/04; B65D 85/42
(52) U.S. Cl. .................. 428/34.2; 428/35.6; 428/76; 428/537.5; 206/531; 206/532; 206/534
(58) Field of Search .................. 428/35.7, 35.6, 428/35.8, 35.3, 34.2, 34.3, 35.2, 35.4, 36.6, 36.7, 75, 76, 537.5; 206/532, 469, 528, 531, 534, 538, 539; 224/5.82

(56) References Cited

U.S. PATENT DOCUMENTS

| | | | | |
|---|---|---|---|---|
| 3,235,395 A | * | 2/1966 | Scharf | 117/3.3 |
| 4,145,918 A | * | 3/1979 | Couch et al. | 116/216 |
| 4,233,195 A | * | 11/1980 | Mills | 260/23 |
| 4,254,173 A | | 3/1981 | Peer, Jr. | |
| 4,434,259 A | | 2/1984 | Gold et al. | |
| 4,567,098 A | | 1/1986 | Becker et al. | |
| 5,631,066 A | | 5/1997 | O'Brien | |
| 5,871,831 A | * | 2/1999 | Zeiter et al. | 428/76 |
| 5,908,527 A | | 6/1999 | Abrams | |
| 6,053,400 A | * | 4/2000 | Rea | 229/101 |
| 6,090,471 A | | 7/2000 | Abrams | |
| 6,352,158 B1 | * | 3/2002 | Cole-Bennett et al. | 206/532 |
| 2001/0010845 A1 | * | 8/2001 | Hoffman et al. | 428/34.2 |

* cited by examiner

Primary Examiner—Michael C. Miggins
(74) Attorney, Agent, or Firm—Baker & Daniels

(57) ABSTRACT

A blister board and a blister package wherein the board and package includes a metallized paper so that the blister material is securely bonded to both the metallized paper and to the underlying paper board material.

5 Claims, 1 Drawing Sheet

METALLIC BOARD

BACKGROUND OF THE INVENTION

This invention pertains to a metallic board and more specifically to a board which is suitable for use in manufacturing a blister package, and to a blister package which utilizes such a board.

Blister packages are well known in the art and generally comprise a supporting blister board to which a blister is adhered. Such a blister, together with the board, defines a space in which articles may be packaged and displayed. Such blister packages are widely used in connection with packaging and displaying various small items such as batteries and the like. The blisters are generally transparent. The blister board generally also includes an aperture by which such packages may be suspended from a rack for display and storage of such packages in stores.

The blisters conventionally are made of transparent material so that the items packaged in the blister packages can be seen and inspected by consumers. When a consumer wishes to access the article within the blister, after purchase, the blister is separated from the backing material. In some blister packages access is provided to the blister by scoring the board.

Conventionally, blister boards have used a metallic finish. Such metallic finishes have conventionally been made of a foil material which is laminated to a blister grade paper board material. Generally, such paper board material has a thickness in the range of 15 to 20 mils (0.015–0.020 inches).

The foil material is generally provided with decorative printing whereby the resulting blister package provides both useful information to a consumer and is more attractive for display purposes.

A disadvantage of the prior art foil covered blister boards has been that the foil may not adhere well to the underlying paper board material. This may especially be true in situations of exposure of blister packages over a period of time to elevated temperatures and varying humidity conditions. Thus, the foil material does not provide an adequate holding strength to tear down the fibers of the backing board material, so that the foil and blister may separate from the backing board material. This leads to a degradation in the packaging, a loss of tamper resistance, and loss of a proper seal of the blister package.

It is therefore desired to provide an improved blister board material which will not delaminate and which therefore provides an improved backing board for a blister package.

It is also desired to provide an improved blister package wherein the foil material will not delaminate from the underlying board material.

SUMMARY OF THE INVENTION

The present invention overcomes the disadvantages of the above-described prior art blister boards and blister packages by providing an improved blister board and blister package.

The improved blister board of the present invention comprises, in one form thereof, a paper blister grade board to which a metallized paper has been laminated. The nature of the laminated paper is such that it will bond integrally to the underlying paper blister grade board material whereby it will not readily delaminate from the underlying paper blister board material.

The present invention further comprises a blister package including a blister laminated to a backing board which comprises a layer of metallized paper and a layer of blister grade paper board material.

An advantage of the present invention is that the metallized paper will adhere well to the underlying blister grade board material. Another advantage of the present invention is that the blister package will not readily delaminate, despite exposure to varying temperatures and humidity levels over extended periods of time.

It is an object of the present invention to provide an improved blister board.

It is a further object of the present invention to provide an improved blister package.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 2:
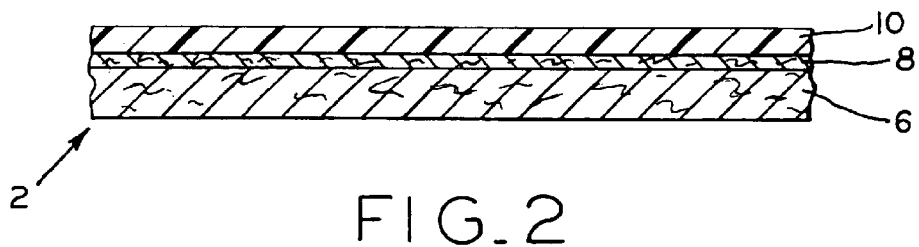
FIG. 2 is a cross-sectional view of a preferred embodiment of a blister board according to the present invention.

Corresponding reference characters indicate corresponding parts throughout the several views of the drawings. The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
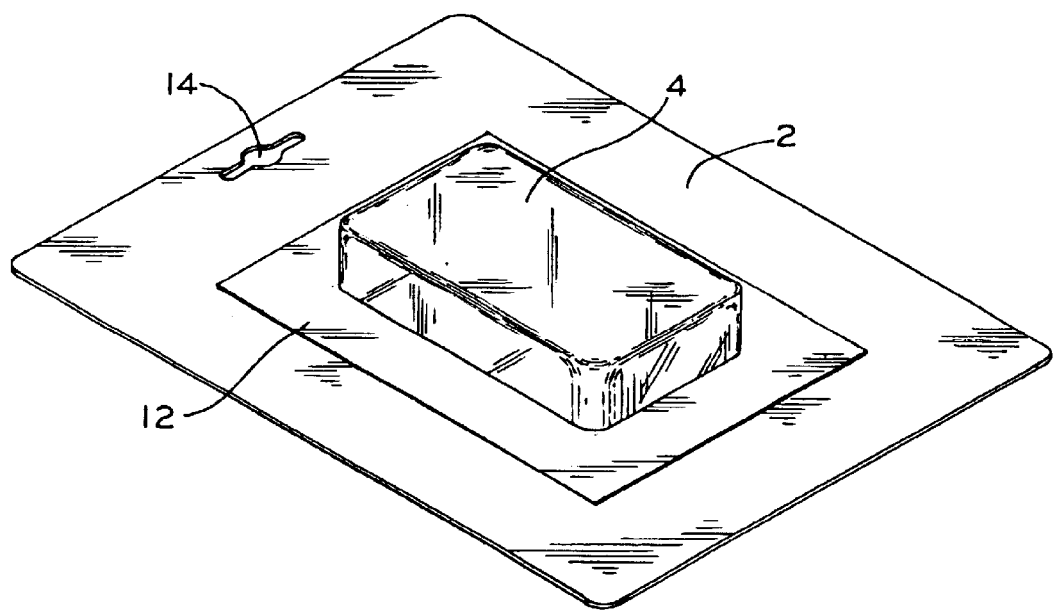
FIG. 1 is a perspective view of a blister package incorporating a preferred embodiment of a board according to the present invention.

Referring to FIG. 1, there is shown a blister package including a blister board 2 and a blister 4.

FIG. 2 shows a cross-section of a blister board 2. The bottom layer 6 of blister board 2 is comprised of solid bleached sulfate (SBS) blister grade board material. The preferred caliper or thickness of such material is generally in the range of 14 mils to 28 mils and more specifically in the range of $15 \geqq 20$ mils. In the preferred embodiment, the thickness has been chosen as 18 mils.

Commercial grade blister board material is readily available and can be obtained from International Paper Corporation, Smurfit—Stone Container Corporation and MeadWestvaco Corporation.

A layer of metallized paper 8 is bonded to the underlying blister grade board material 6 by a conventional laminating method. It should be understood that metallized paper is different from foil material. Foil material comprises a very thin layer of metal such as, for instance, aluminum. When such foil material is laminated to a blister grade board material, an integral bond is not formed. In other words, the metal foil simply overlays the paper and is secured thereto by an adhesive. The foil material does not bond directly to the fibers of the underlying paper layer. On the other hand, metallized paper, such as layer 8, comprises a paper on which a metal layer has been deposited by evaporation in a vacuum. Such metallized paper thus comprises paper on which metal particles have been deposited. Examples of metallized paper and methods for its production can be found in U.S. Pat. Nos. 4,567,098 and 4,434,259.

The applicants have found that a suitable metallized paper will provide bonds to the fiber of the SBS Substrate. Such metallized paper may also be decorated with ink, to make the board and the resulting blister package more attractive looking. Applicants have found that a preferable thickness range for metallized paper is 2.0–2.1 mils.

The metallized paper successfully used by Applicants is a light weight metallized material, 2.10 mil thick with gloss levels at 55 with a 60 degree angle. The material will provide moisture vapor barriers (MVTR moisture vapor transmission rate) of 0.83 Grams per 100 Square inches in 24 hours and Oxygen Transmission rates of 279 cc per 100 square inches in 24 hours. Print side lacquer primers are added over the metallized layer to improve ink adhesion and prevent oxidation.

The blister grade of paper board used for the base product of the metallized package is a low density virgin grade of paper board available in caliper ranges from 014" to 028". The clay coating applied to the surface area of this product allows for the adhesion of films to the surface when heat-sealable coatings are applied. This material is specifically manufactured for blister heatseal applications.

The applicants have found that such metallized paper can be successfully laminated by conventional lamination techniques to a suitable blister grade board material to form a superior blister packaging board. The metallized paper is laminated to the underlying blister grade board material by means of an adhesive, such as a latex adhesive, and using standard laminating techniques. Other suitable adhesives are solvent and solventless polymers.

After the metallized paper is laminated to the blister grade board, a layer of adhesive 10 will be applied to the metallized paper. Suitable adhesives for such use are latex, solvent, and solventless polymers.

A suitable blister is then adhered at area 12 of the blister to the paper by well known heat sealing techniques. A blister, as shown in FIG. 1, can be manufactured of various materials, for instance, polyvinyl chloride (PVC), polyethylene terephalate (PET), recycled polyethylene terephalate (RPET), and polyethylene tetrephalate-glycol-modified (PETG) materials. The blisters may be transparent so that the articles to be packaged in the blister package can be displayed and inspected by a consumer. As shown in FIG. 1, only a border 12 of the blister is laminated to board 2.

Applicants have found that by the use of a metallized paper, instead of foil, an excellent bond will be made by the blister material with the blister board. The bond will be made by means of the adhesive coating 10, through the metallized paper itself, whereby the blister will also bond with the fibers of the paper board. Thus, the blister will not readily separate from the metallized paper nor the metallized paper from the board.

While this invention has been described as having a preferred design, the present invention may be further modified within the spirit and scope of this disclosure. This application is therefore intended to cover any variations, uses, or adaptations of the invention using its general principles.

What is claimed is:

1. A blister package comprising:
    a bottom layer of paper blister grade board material;
    a layer of metallized paper secured and disposed on said layer of paper blister grade board material;
    an adhesive coating disposed on said layer of metallized paper;
    a blister bonded to both said metallized paper and said layer of paper blister grade board material by said adhesive coating through said metallized paper.
2. The board according to claim 1 wherein said metallized paper layer has a thickness in the range of 2.0 to 2.1 mils.
3. The board according to claim 1 wherein said layer of paper blister grade has a thickness in the range of 14 to 28 mils.
4. The blister package according to claim 1 wherein said blister is transparent.
5. The blister package according to claim 1 wherein said metallized paper is decorated with decorative ink.

\* \* \* \* \*